July 23, 1957  J. J. RILEY  2,800,612
CONTROL SYSTEM FOR THE PROTECTION OF WELDING TRANSFORMERS
Filed May 5, 1954
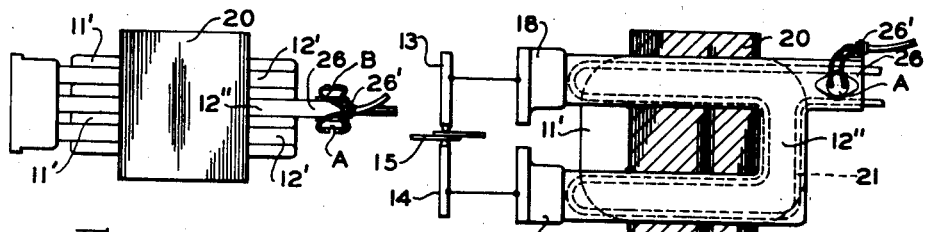
Fig. 1   Fig. 2
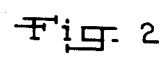
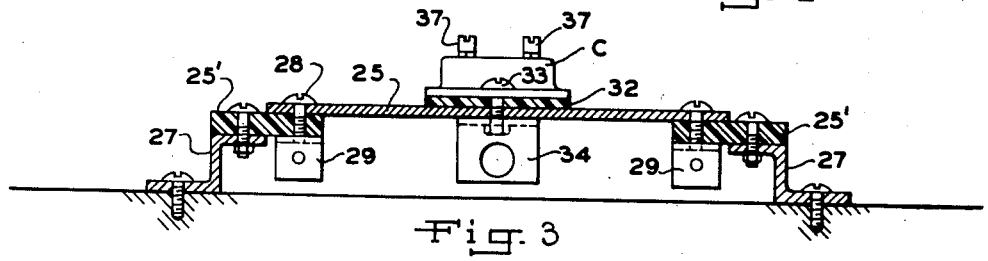
Fig. 3
Fig. 4
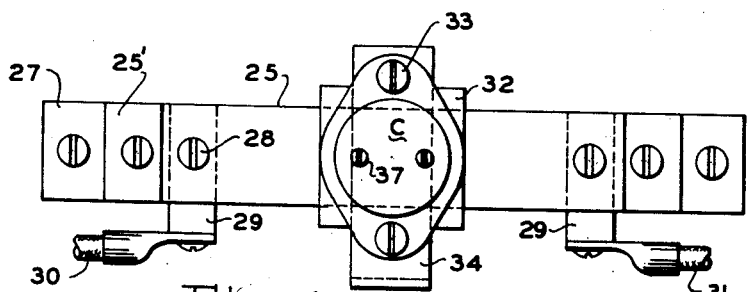
Fig. 5   Fig. 6
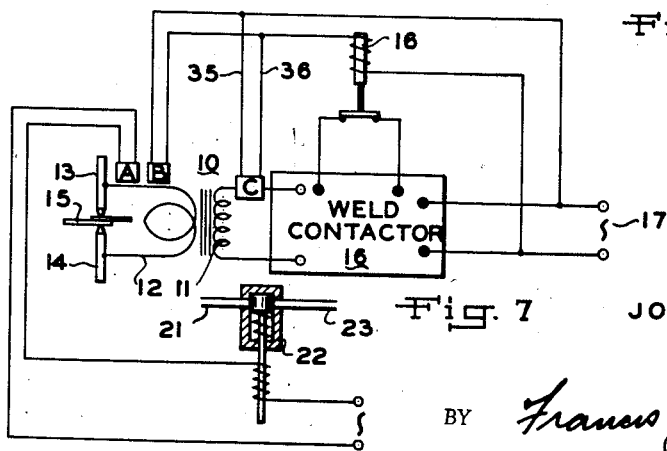
Fig. 7
INVENTOR
JOSEPH J. RILEY
BY *Francis J. Klempay*
ATTORNEY United States Patent Office 2,800,612
Patented July 23, 1957

2,800,612

CONTROL SYSTEM FOR THE PROTECTION OF WELDING TRANSFORMERS

Joseph J. Riley, Warren, Ohio, assignor to The Taylor-Winfield Corporation, Warren, Ohio, a corporation of Ohio Application May 5, 1954, Serial No. 427,841

1 Claim. (Cl. 317—14)

The present invention relates to electric resistance welding apparatus, particularly welding transformers, and has particular reference to control apparatus for avoiding overheating of welding transformers and other occurrences tending to damage or reduce the normal operating life of welding transformers.

As an overall object, the present invention seeks to provide a comprehensive or integrated control system for use in conjunction with conventional electric resistance welding circuitry whereby the apparatus may be automatically shut down when overloaded to the danger point and whereby undesirable moisture condensation and the like may be avoided.

In the construction of conventional electric resistance welding transformers there may be employed a number of primary windings or coils, comprising a relatively large number of turns of the primary conductor, and one or more secondary conductors, each generally comprising a single turn formed of heavy conductor material. Generally the secondary conductor is provided with cooling means such as suitable copper tubing welded or brazed directly to the conductor, or in some cases water passages are formed internally of the conductor as by casting suitable tubing within the conductor or by forming the conductor of hollow material.

The operation of welding apparatus is of course highly intermittent; that is, generally there are considerable periods when no current whatsoever flows through the welding transformer, interrupted by periods when welding current of high magnitude is flowing. Usually the welding current is considerably in excess of the continuous current rating for the transformer.

Thus, it will be understood that there may be occasions when welding apparatus is utilized continuously at an excessive average rate, for example, whereby the welding transformer is overburdened and eventually caused to overheat. This may also happen on occasion, of course, where the cooling system becomes clogged or otherwise defective. Accordingly, the present invention provides, in part, for the automatic prevention of further current flow through the welding transformer when the secondary conductor thereof becomes heated to excess.

In conventional welding transformers, the secondary conductor being water cooled, it is not uncommon for the primary coil or coils to become heated to excess even though the secondary conductor is operating within safe temperature ranges. This may be explained by the fact that the various turns of the primary coils are individually insulated, and generally further insulation is provided about the coil as a whole, so that transfer of heat from the primary coil is impeded to a certain extent. Thus, it is a further object of the present invention to provide a safety control of the type described which includes in addition to the means stated in the above object additional means responsive to overheating of the primary coil and independent of the operation of the secondary conductor to prevent further operation of the welding apparatus.

In conjunction with the above object, it is a further object of the present invention to provide a control device for the purpose concerned which may be readily installed in conventional welding transformers and which is accurately responsive to the temperature of the primary conductors, as distinguished from the exterior temperature of the coil, for example.

A further object of the invention is the provision of control means for use in intermittently operated water cooled welding transformer apparatus whereby condensation of water on or about the transformer is substantially avoided. The instant object contemplates the provision of means operative in response to the water cooled secondary conductors reaching a temperature at which condensation may occur to automatically interrupt the further flow of cooling water.

Another object of the invention resides in the provision of a welding transformer and comprehensive safety control circuitry therefor which is of a simplified character, adapted for easy maintenance of both the transformer and the circuit components, and which is so constructed that the incorporation of the desired control components may be effected without substantial alteration of the mechanical features or electrical characteristics of the apparatus.

The above and other objects and advantages of the invention will become apparent upon full consideration of the following detailed specification and accompanying drawing wherein is illustrated a preferred embodiment of the invention.

In the drawing:

Figure 1 is a top plan view of a welding transformer incorporating control features in accordance with the teachings of the invention;

Figure 2 is a longitudinal section view of the transformer and associated apparatus of Figure 1;

Figure 3 is a side elevation, partly in section of an improved circuit component for incorporation in the comprehensive transformer protective system of my invention;

Figure 4 is a top plan view of the device of Figure 3;

Figures 5 and 6 are simplified schematic representations showing suggested methods of employing the device of Figures 3 and 4 in an energizing circuit for the transformer of Figures 1 and 2; and Figure 7 is a simplified schematic representation of my comprehensive control arrangement.

Referring now to the drawing, and initially to Figure 7 thereof, there is shown a welding transformer 10, comprising primary coils 11 and secondary conductor 12, the latter connecting suitable welding electrodes 13 and 14 positioned on opposite sides of overlapped workpieces 15. To energize the welding apparatus there is provided a conventional contactor control 16 connecting a source of power 17. Suitable means, not shown, are of course employed to control the contactor 16 whereby same may be caused to pass welding energy at the times and in the amounts desired.

Welding transformer 10 is shown in more detail in Figures 1 and 2, and is shown therein to comprise a plurality of laterally spaced U-shaped secondary conductors 12′ and one or more modified secondary conductors 12″, all of which comprise the complete secondary coil or conductor 12 as represented in Figure 7. At the forward ends of the conductors 12′ and 12″ are common pole pads 18 and 19 which connect with the welding electrodes 13 and 14 as indicated schematically in Figure 2.

Between the individual secondary conductors 12′ and 12″ are oval-shaped primary coils 11′, each comprising a plurality of windings of primary conductor. And in accordance with usual practice, the individual windings of the primary coils are separately wrapped or insulated, and further insulation is wrapped about the entire coil.

On the other hand, the secondary conductors 12' and 12" are generally uninsulated, for the most part.

A suitable laminated iron core 20 is conventionally provided about the assembled coils 11 and 12 and through the center thereof.

As shown in Figure 2 the secondary conductors 12' and 12" are provided with internal passages 21 for cooling water. Such passages may be in the form of tubes cast into the conductors, for example, or welded thereto, or the conductors may themselves be in the form of hollow tubes, all as is well known in the art.

To circulate cooling water through the passages 21 there is provided a suitable solenoid operated valve 22 (Figure 7) connecting the passages 21 with a source of water or other cooling fluid 23.

In humid weather the continued flow of cooling water through the passage 21, after the secondary conductors 12' and 12" have cooled, often causes moisture from the atmosphere to condense upon the conductors 12' and 12". And, as will be readily understood, such moisture may seep into the primary coils, causing damage to the same after a period of time. To avoid this I provide, in accordance with the teachings of the invention, a suitable thermostatic control switch "A" which is positioned in heat exchange relation with the secondary conductor 12" and which is operative in response to the said conductor 12" reaching a predetermined minimum temperature to de-energize the solenoid valve 23, preventing further flow of cooling medium. The temperature at which valve 23 is de-energized and closed should, of course, be somewhat above expected dew point temperatures so that condensation is avoided under all circumstances.

To avoid overheating of the secondary conductors 12' and 12" I provide a second thermostatic control switch "B" which is positioned in heat exchange relation with the secondary conductor 12" and which is operative upon this conductor reaching a predetermined maximum temperaure to close an energizing circuit for a relay 24, having the ultimate effect of de-energizing the weld contactor 16.

In accordance with the teachings of the invention I have provided a novel arrangement for mounting the last mentioned thermostatic control swiches "A" and "B" comprising a modified secondary conductor 12". While the modified conductor 12" is generally U-shaped there is provided a rearwardly extending integral portion 26, as shown in Figures 1 and 2, which projects outwardly of the general outlines of the other secondary conductors 12' and primary coils 11. Thus, the extending portion 26 is freely accessible.

On each side of the extending portion 26 is mounted one of the thermostatic control switches "A" or "B." Or, in some cases it may be desirable to mount both switches "A" and "B" on one side.

At the top of the extending portion 26 is mounted an L-shaped bracket 26' which receives and secures a control cable housing a plurality of control conductors, substantially as shown in Figures 1 and 2. The control conductors extend downwardly to the switches "A" and "B" and are appropriately connected thereto in the manner shown.

It will be noted that the extending portion 26, in addition to being freely accessible for assembly and maintenance, has no substantial effect upon the electrical characteristics of the assembly. Moreover, due to the highly heat conductive nature of the secondary conductors, which are generally made of copper, an accurate indication of the temperature conditions in the secondary is afforded.

In many instances the operating conditions for the welding apparatus may be such that the secondary conductors are well within safe temperature ranges while the primary coils are operating at unsafe temperatures. This may occur, for example, when the supply of cooling liquid is at an abnormally low temperature whereby heat is conducted rapidly away from the secondary circuit, while the insulated primary coils dissipate heat more slowly. Thus, the overheating protection, afforded by the thermostatic control switch "B" is not adequate for all purposes. Accordingly, I provide a further thermostatic control switch "C" which is associated with the primary coils in such manner as to provide an accurate determination of the temperature thereof wholly independently of the temperature of the secondary conductors.

Now, inasmuch as the primary coils are insulated, and heat transfer therefrom is necessarily impeded, I have provided, in accordance with the teachings of the invention, a circuit member 25 having a predetermined resistance which is placed in series with all or some of the primary coils 11' so that the primary current, or a portion thereof, is caused to pass through the resistance member 25 during operation of the welding apparatus.

In the illustrated embodiment of the invention the resistance member 25 is in the form of a flat strip secured at its ends to insulating members 25' which are in turn secured to suitable mounting brackets 27. The brackets 27 may be secured in any desirable location on or about the welding transformer as will be understood.

To secure the ends of the resistance member 25 I employ bolts 28 which extend through the member 25 and the insulating blocks 25' to engage terminal brackets 29. The brackets 29 have suitable apertures or binding posts so that primary conductors 30 and 31 may be electrically connected thereto to place the resistance member 25 in series in the primary circuit.

Mounted in heat exchange relation with the resistance member 25 is the thermostatic control switch "C," an insulating sheet 32 for mica, for example, being inserted between the base of the switch "C" and the resistance member 25. In the illustrated apparatus the switch "C" is secured by bolts 33 spaced outwardly of the resistance member 25 and engaging an L-shaped bracket 34 at the under side of the resistance member. The bracket 34 has suitable means to receive and secure a control cable to facilitate the interconnection of suitable control conductors 35 and 36 (Figure 7) to the terminals 37 of the switch "C."

As will be observed in Figure 7, switch "C" is connected in parallel with switch "B" so that upon closing of either of these switches relay 16 is energized so that the weld contactor 16 is rendered ineffective, preventing further flow of welding energy through the transformer 10. Thus, it will be observed that overheating of either the primary or secondary coils of the transformer 10 will cause the welding apparatus to be shut down, notwithstanding that one or the other may be operating within perfectly safe ranges.

It should thus be apparent that I have accomplished the several objects initially set forth. My control provides a comprehensive and dependable protective system for welding transformers whereby accurate indications are afforded of both secondary and primary operating conditions, each independent of the other, and when safe limits are exceeded in either the apparatus is shut down. My control is such as to operate effectively in a system which is employed intermittently, in alternate periods of inoperation and operation in excess of rated capacities. While a direct contact control is provided for the secondary conductors, a series connected current responsive device is associated with the insulated primary so that an accurate indication of the operating conditions of the primary conductors is afforded, independently of the rate of heat transfer or dissipation from the primary windings, it being understood that such transfer or dissipation may vary from time to time in view of varying secondary temperatures, atmospheric conditions, and the like.

In addition to the above features I provide a further control whereby during the intermittent operation of the welding apparatus if the water cooled secondary conductors become cooled substantially to the dew point temperature the further flow of cooling medium is prevented. I thereby avoid condensation of atmospheric moisture on or about the transformer coils.

Another novel feature of my invention is the provision of a modified secondary conductor having an outwardly extending integral portion which protrudes beyond the normal outlines of the transformer assembly so that control switches "A" and "B" may be readily installed and serviced. Moreover, the extending portion 26 has no substantial effect upon either the mechanical structure of the complete welding transformer, or its electrical characteristics.

It should be understood, however, that the apparatus herein specifically shown and described is intended to be representative only, as many alterations may be made therein within the clear teachings of the invention. Reference should therefore be had to the following appended claim in determining the full scope of the invention.

I claim:

In apparatus of the character described, including a welding transformer, the combination of a plurality of flat spaced parallel forwardly facing U-shaped heavy conductors collectively constituting the secondary turn of said welding transformer, a plurality of multi-turn flat generally oval primary coils interposed between said forwardly facing U-shaped conductors and conforming generally to the physical outlines of said conductors, the forward end portions of the legs of said U-shaped conductors extending forwardly of the physical outlines of said coils and constituting secondary terminal portions, one of said U-shaped conductors having an integral tab-like portion at the rear end thereof extending rearwardly of the physical outlines of said coils in a direction rearwardly of said secondary terminal portions, and a temperature responsive control device mounted on said tab-like portion for actuation in response to the temperature of said one of said U-shaped conductors.

References Cited in the file of this patent

UNITED STATES PATENTS

| | | |
|---|---|---|
| 1,717,216 | Isaac | June 11, 1929 |
| 1,852,805 | Frank | Apr. 5, 1932 |
| 2,117,583 | Antwerp | May 17, 1938 |
| 2,378,884 | Seifert | June 19, 1945 |
| 2,525,499 | Peterson | Oct. 10, 1950 |
| 2,607,831 | Jones | Aug. 19, 1952 |
| 2,619,521 | Cuttino | Nov. 25, 1952 |

FOREIGN PATENTS

| | | |
|---|---|---|
| 131,190 | Switzerland | Apr. 1, 1929 |